(12) United States Patent
Liatard et al.

(10) Patent No.: US 6,232,772 B1
(45) Date of Patent: May 15, 2001

(54) DEVICE FOR MEASURING THE ROTATION OF A ROTATING ELEMENT

(75) Inventors: Bernard Liatard, Gruffy; Rene Nantua, Sillingy; Isabelle Riviere, Seynod, all of (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/183,251

(22) Filed: Oct. 30, 1998

(51) Int. Cl.[7] .............................. G01B 7/30; G01P 3/487; G01R 33/038
(52) U.S. Cl. .................... 324/207.25; 324/174; 324/226; 384/448
(58) Field of Search ................................ 324/173, 207.25, 324/174, 226; 384/137, 448; 15/93.1; 280/855, 856; 73/494

(56) References Cited

U.S. PATENT DOCUMENTS

| | | | |
|---|---|---|---|
| 4,400,890 | * 8/1983 | Ohkubo et al. | 33/125 C |
| 4,631,403 | 12/1986 | Rieder et al. | 250/237 G |
| 5,157,329 | * 10/1992 | Brauer | 324/207.25 |
| 5,640,087 | 6/1997 | Alff | 324/173 |

\* cited by examiner

*Primary Examiner*—Jay Patidar
*Assistant Examiner*—Henry S. Andersen
(74) *Attorney, Agent, or Firm*—John C. Bigler

(57) ABSTRACT

A device for measuring the rotation of a rotating element comprising an encoder element rotating with the rotating element and a sensor unit connected to a stationary element. A scraping element cooperates with a surface of the encoder element in order to eliminate contaminating particles present on the surface of the encoder element. The scraping element may be carried on the sensor device and may be biased against the encoder element by an elastic device or by magnetism.

6 Claims, 4 Drawing Sheets

DEVICE FOR MEASURING THE ROTATION OF A ROTATING ELEMENT

BACKGROUND OF THE INVENTION

This invention relates generally to a device for measuring the rotation of a rotating element and, more particularly, to a device which has an encoder element that is carried by the rotating element and that cooperates with a sensor unit connected to a stationary element.

Conventionally, devices for measuring the angular position or speed of a rotating element include a sensor unit; immobile with respect to a measuring reference frame, cooperating with an encoder put in rotation by the rotating element, to provide a signal to an electronic processing center. A disadvantage of this type of device is that the active surface of the encoder facing the sensor, which is most often a multipolar magnetic surface or a surface with regularly spaced perforations possibly covered with a plastic or rubber-type protective film, is particularly sensitive to deposits of all sorts, possibly leading to disturbances of the generated signal. In particular, during the operation of such devices in an unfavorable environment, contaminating particles can adhere by projection or by magnetic attraction to the encoder.

A known approach to remedy this disadvantage is to enclose the encoder in a sealed enclosure in order to prevent the introduction of contaminating particles during operation. An example of this type of device is described and illustrated in the document EP-A-0 675 364 filed by The Timken Company. However, that proposed solution leads to the realization of a device which is complex and expensive to produce and does not make it possible to eliminate contaminating particles from depositing on the encoder during the phase of assembling the device in workshops.

Also proposed, as described and illustrated in the French patent application FR-A-2 730 566 filed by SKF, is a magnetic encoder device for a speed sensor in which the magnetic encoder is attached to a protective element. However, the thickness of the protective element increases the air gap between the magnetic encoder and the sensor and reduces the quality of the magnetic field received by the sensor, which makes the device more sensitive to exterior disturbances and reduces its range of operation.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a device for measuring the rotation of a rotating element comprising an encoder element, a sensor unit, and a scraping means. The encoder element rotates with the rotating element, and the sensor unit is connected to a stationary element. The scraping means cooperates with a surface of the encoder element in order to remove contaminating particles from the surface of the encoder element before the surface of the encoder element passes in front of the sensor unit.

The foregoing and other aspects will become apparent from the following detailed description of the invention when considered in conjunction with the accompanying drawing figures.

BRIEF DESCRIPTION OF THE DRAWING FIGURES

In order to facilitate reading of the drawings, similar elements bear the same references from one figure to another. Furthermore, only the elements necessary for comprehension of the invention appear.

DETAILED DESCRIPTION

Figure 1:
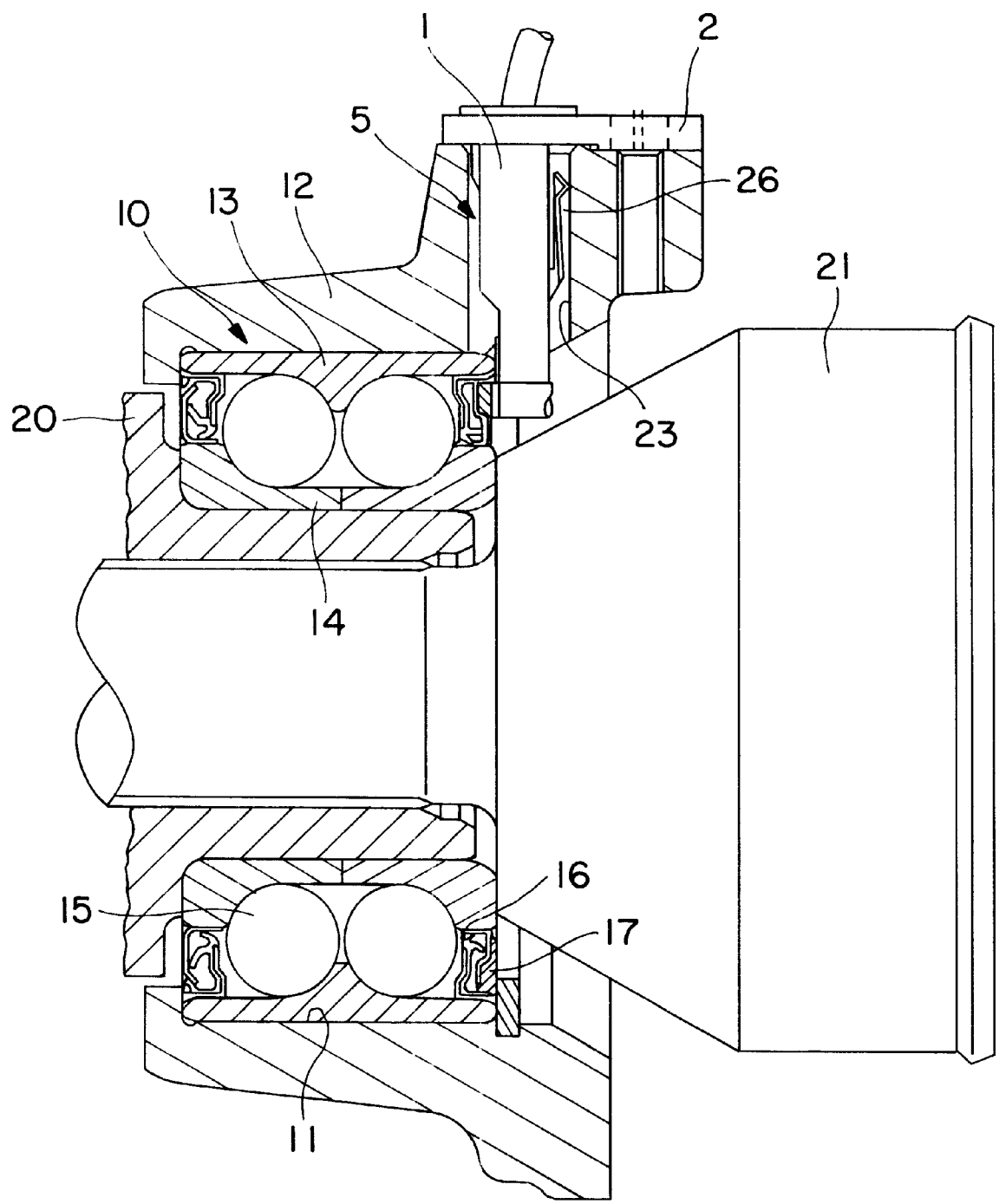
FIG. 1 is an axial sectional view of a vehicle wheel hub equipped with a bearing provided with a device for measuring rotation, illustrating the present invention.

Referring now to the drawings, FIG. 1 illustrates the present invention as applied to a bearing mounted in wheel hub 20 connected to transmission shaft 21 of an automobile by internal drive grooves. The bearing comprises ball bearing 10 in bore 11 of stationary steering knuckle pin 12, having outer ring 13 in a conventional manner, inner rotating ring 14 in two parts which are immobilized on rotating hub 20, rolling elements 15 arranged between said rings and seal 16. Seal 16, as described in patent application FR-A-9300458 filed in the name of the applicant, incorporates magnetic encoder element 17, mounted on rotating ring 14, and positioned precisely with respect to the lateral surface of stationary ring 13.

Steering knuckle pin 12 has a housing, provided with radial hole 23, for mounting sensor unit 5, and a threaded hole for receiving a screw for immobilization of attachment element 2 for sensor unit 5. This sensor unit 5, as described in patent application FR-A-9402626 filed in the name of the applicant, has flange 2 for adjustment and attachment. Flange 2 has a hole for receiving an immobilization screw and has a body 1, which has a measuring sensor located at a detection surface 3 referenced in FIG. 2, facing magnetic encoder 17. Body 1 optionally has elastic support tab 26, represented only in FIG. 1, which contacts a wall of mounting opening 23 for biasing body 1 near magnetic encoder 17.

Figure 2:
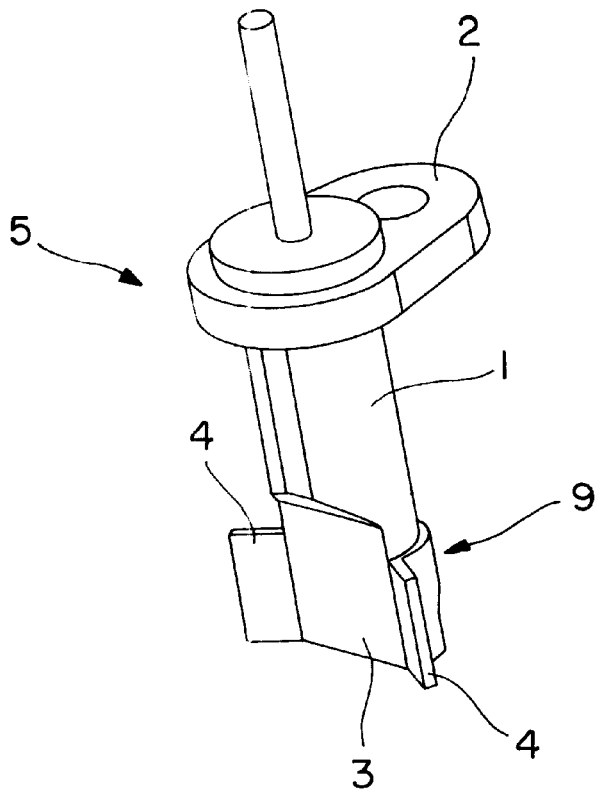
FIG. 2 is a perspective view of a first embodiment of the sensor unit and fastener of FIG. 1, illustrating the present invention.
Figure 3:
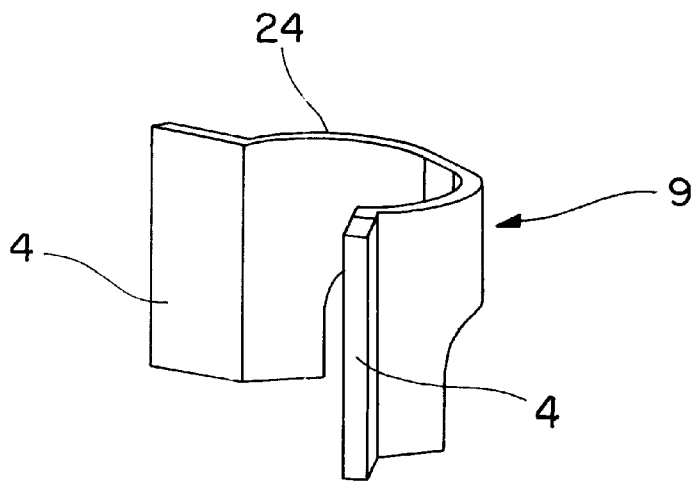
FIG. 3 is a perspective view of the fastener connected to the sensor unit of FIG. 2.

As can be seen more precisely in FIG. 2, illustrating sensor unit 5 according to a first embodiment of the device according to the invention, sensor unit 5 has a connected fastener 9 which is attached to a recess made in body 1 adjacent to detection surface 3. This fastener 9, illustrated alone in FIG. 3, has two symmetrical blades 4 connected to reinforcement 24. Once fastener 9 is positioned on body 1, blades 4 extend laterally on both sides of detection surface 3 in the direction of magnetic encoder 17. These blades 4 are defined so as to be in contact with the active surface of magnetic encoder 17, the shape and length of blades 4 being determined so as to maintain a sufficient pressure in order to clean any contamination from the surface of magnetic encoder 17.

Fastener 9 can be made of plastic or rubber or may be a metallic single-piece element. Alternatively, fastener 9 may have blades 4 made of plastic or rubber molded on metallic reinforcement 24, the use of a metallic reinforcement 24 furthermore making it possible to channel the magnetic field lines from magnetic encoder 17 towards detection zone 3 of sensor carrier 5. Advantageously, blades 4 will be made of a magnetic metallic material or of plastic or rubber loaded with magnetic particles so that blades 4 are constantly flattened against the active surface of magnetic encoder 17 by magnetic attraction. The force of application of blades 4 against the active surface of magnetic encoder 17 can also be produced by elastic tab 26 of body 1, with this force determined as a function of the rigidity of blades 4.

In the device realized in this way, when magnetic encoder 17 is put in rotation by hub 20, the contaminating particles on the active surface of magnetic encoder 17 run against the edge of blades 4 and are ejected by the speed of rotation and the shape of blades 4 to the outside of hub 20. Furthermore, the symmetrical position of blades 4 makes possible the cleaning of the active surface of magnetic encoder 17 independently from the direction of rotation of the magnetic encoder.

Figure 4:
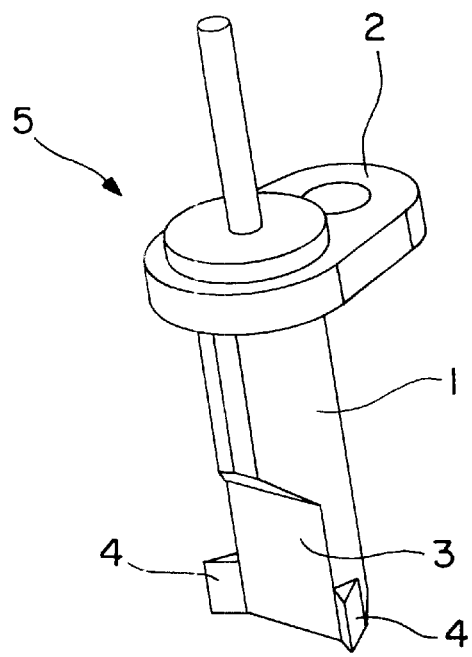
FIGS. 4 through 6 are alternative embodiments of the sensor unit for the measuring device of FIG. 1, illustrating the present invention.
Figure 5:
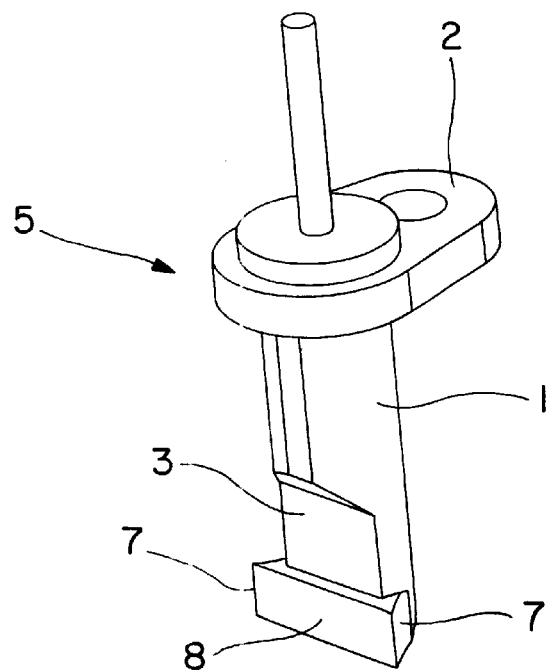
Figure 6:
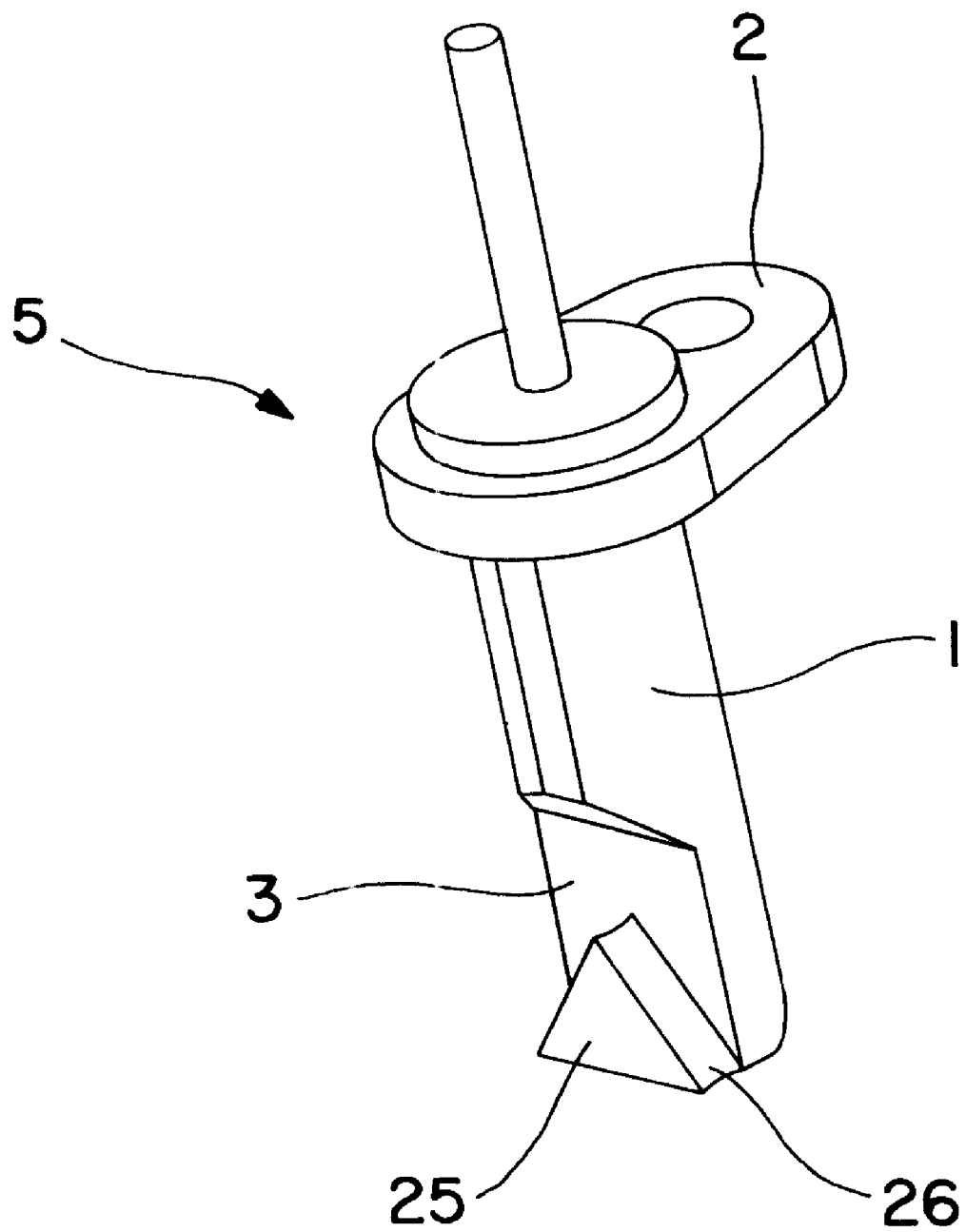

FIGS. 4 through 6 illustrate alternative embodiments of the sensor unit of the present invention which can be used equally in the measuring device of FIG. 1.

As represented in FIG. 4, body 1 of sensor unit 5 has two symmetrical blades 4 arranged on both sides of detection surface 3 which is recessed from the exterior diameter of body 1. In the example shown, blades 4 are molded integrally with body 1 and have shapes which are configured in such a way as to facilitate the evacuation of the particles by ejecting them to the outside regardless of the direction of rotation of the magnetic encoder. For this purpose, blades 4 have the shape of a prism with edges that rub the active surface of magnetic encoder 17, the surface of the prism oriented towards the exterior of body 1 being inclined slightly from a perpendicular to the plane of magnetic encoder 17 so as to expel particles which run against blades 4 in the opposite direction from magnetic encoder 17.

The reduced size of blades 4 makes it possible to maintain a reduced space requirement which is compatible with the mounting of sensor unit 5 in its housing. In FIG. 5, which illustrates an alternative embodiment of the sensor unit illustrated in FIG. 4, the blades are replaced by base plate 8 partly covering detection surface 3 of the body and having two inwardly curving ends 7 for ejection of the particles outward. This base plate 8 is produced by simultaneous molding with body 1 or by later molding.

FIG. 6 illustrates yet another embodiment of the present invention, in which the scraping means is produced by prism 25 formed by molding on detection surface 3 of sensor unit 5. The surface of prism 25 which contacts magnetic encoder 17 has a triangular shape with two sides 26 inclined with respect to the direction of rotation of the magnetic encoder and oriented in the direction of the exterior of hub 20 when sensor unit 1 is positioned in its housing.

The present invention provides a device for measuring the rotation of a rotating element which is easy to assemble, and which ensures the cleaning of the active surface of the encoder, while being simple and economical to use. The resulting measuring device has a small space requirement. Scraping means, which may be carried by the sensor unit, cooperates with the surface of the encoder element and is biased against the encoder element in order to remove the contaminating particles present on the surface of the encoder element before its passage in front of the sensor.

As a result of the present invention, regardless of the embodiment, any particle deposited on the encoder element during the phase of assembling the device or during operation in an adverse environment is immediately detached and evacuated from the active surface of the encoder element before it arrives opposite the sensor. This makes it possible, by simple and inexpensive means, to greatly increase the reliability of the measurements.

Of course, the invention is not limited to the embodiments described and illustrated, which are given only as examples. Thus, the invention is advantageously applied not only to devices containing magnetic encoders as described in the execution examples, but it can also be applied to devices using perforated encoders, either with or without a protective film, and on which particles can also be deposited.

Having described the invention, what is claimed is:

1. A device for measuring the rotation of a rotating element, the device comprising:

an encoder element rotating with the rotating element;

a sensor unit connected to a stationary element; and scraping means carried by the sensor unit, the scraping means cooperating with a surface of the encoder element in order to remove contaminating particles from the surface of the encoder element before the surface of the encoder element passes in front of the sensor unit, the scraping means and the encoder element being formed from materials selected for mutual attraction by magnetic attraction.

2. The device for measuring the rotation of a rotating element according to claim 1, wherein the scraping means is made of a metallic material and the encoder element is magnetic such that the scraping means is biased against the encoder element by magnetic attraction.

3. A device for measuring the rotation of a rotating element, the device comprising:

a magnetic encoder element rotating with the rotating element;

a sensor unit connected to a stationary element, the sensor unit having a body; and scraping means carried by the sensor unit, the scraping means cooperating with a surface of the encoder element in order to remove contaminating particles from the surface of the encoder element before the surface of the encoder element passes in front of the sensor unit, the scraping means comprising blades formed integrally with the body of the sensor unit arranged laterally on both sides of a detection surface of the sensor unit facing the encoder element, with the blades contacting the surface of the encoder element, the blades being carried by a fastener connected to the sensor unit which has a suitable shape and elasticity so that ends of the blades constantly contact the surface of the encoder element, the fastener including a metallic reinforcement that serves to channel magnetic field lines of the encoder element in the direction of the sensor.

4. A device for measuring the rotation of a rotating element, the device comprising:

an encoder element rotating with the rotating element;

a sensor unit connected to a stationary element, the sensor unit having a body; and scraping means carried by the sensor unit, the scraping means cooperating with a surface of the encoder element in order to remove contaminating particles from the surface of the encoder element before the surface of the encoder element passes in front of the sensor unit, the scraping means comprising blades formed inte grally with the body of the sensor unit arranged laterally on both sides of a detection surface of the sensor unit facing the encoder element, with the blades contacting the surface of the encoder element.

5. A device for measuring the rotation of a rotating element, the device comprising:

an encoder element rotating with the rotating element;

a sensor unit connected to a stationary element; and scraping means carried by the sensor unit, the scraping means cooperating with a surface of the encoder element in order to remove contaminating particles from the surface of the encoder element before the surface of the encoder element passes in front of the sensor unit, the scraping means comprising a prism configuration molded on a detection surface of the sensor unit facing the encoder element, the prism configuration having lateral faces that are inclined with respect to the direction of rotation of the rotating element such that ejection of contaminating particles from the surface of the encoder element is promoted.

6. A device for measuring the rotation of a rotating element, the device comprising:

an encoder element rotating with the rotating element;

a sensor unit connected to a stationary element; and scraping means carried by the sensor unit, the scraping means cooperating with a surface of the encoder element in order to remove contaminating particle from the surface of the encoder element before the surface of the encoder element passes in front of the sensor unit, the scraping means comprising a base plate molded on a detection surface of the sensor unit, the base plate having two inwardly curving ends permitting ejection of contaminating particles from the surface of the encoder element.

* * * * *